April 21, 1925.
W. J. BELCHER
1,534,494
POWER TRANSMISSION CHAIN
Filed Feb. 15, 1921    3 Sheets-Sheet 1
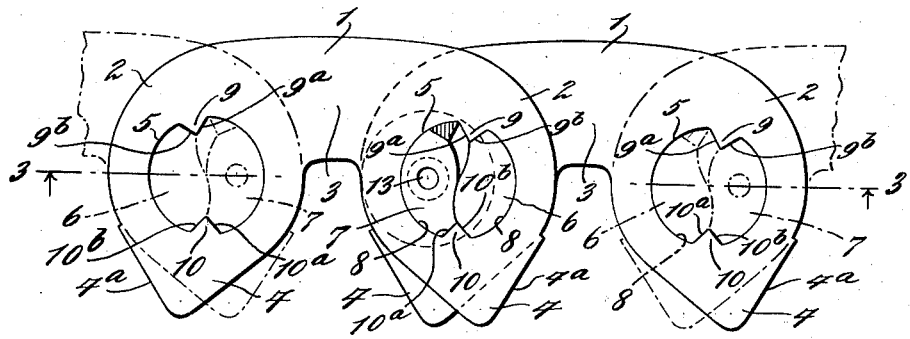
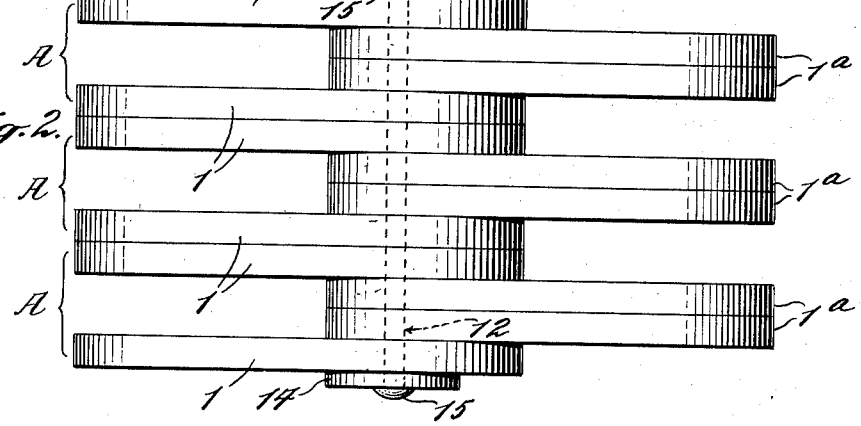
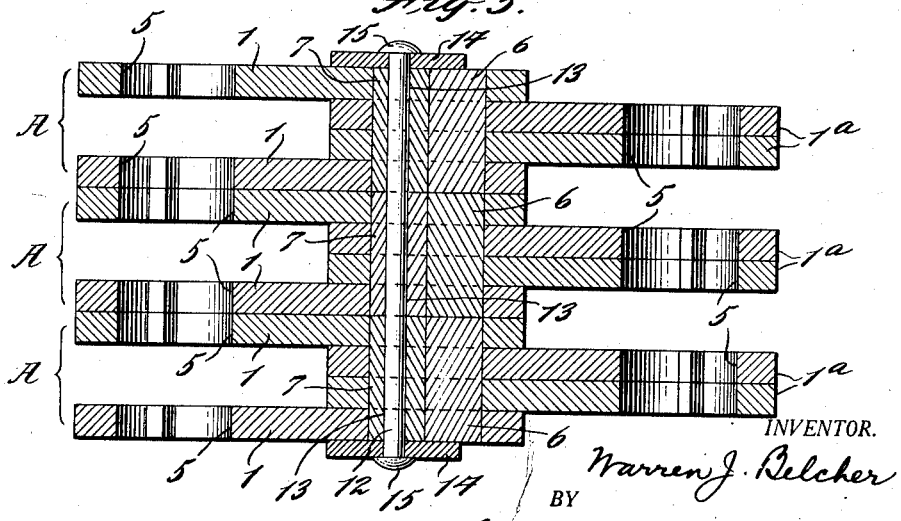
INVENTOR.
Warren J. Belcher
BY
Gifford Bull
his ATTORNEYS April 21, 1925.
W. J. BELCHER
POWER TRANSMISSION CHAIN
Filed Feb. 15, 1921
3 Sheets-Sheet 2
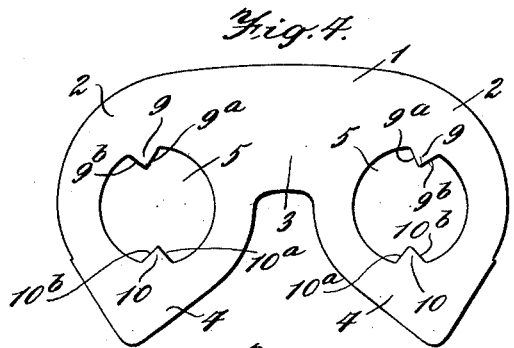
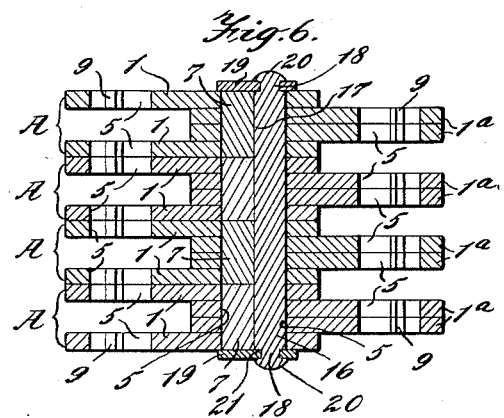
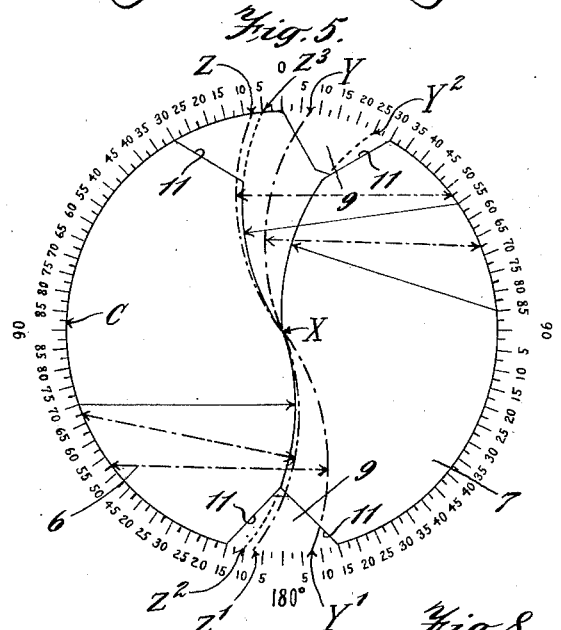
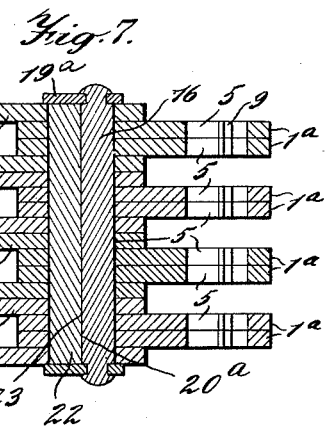
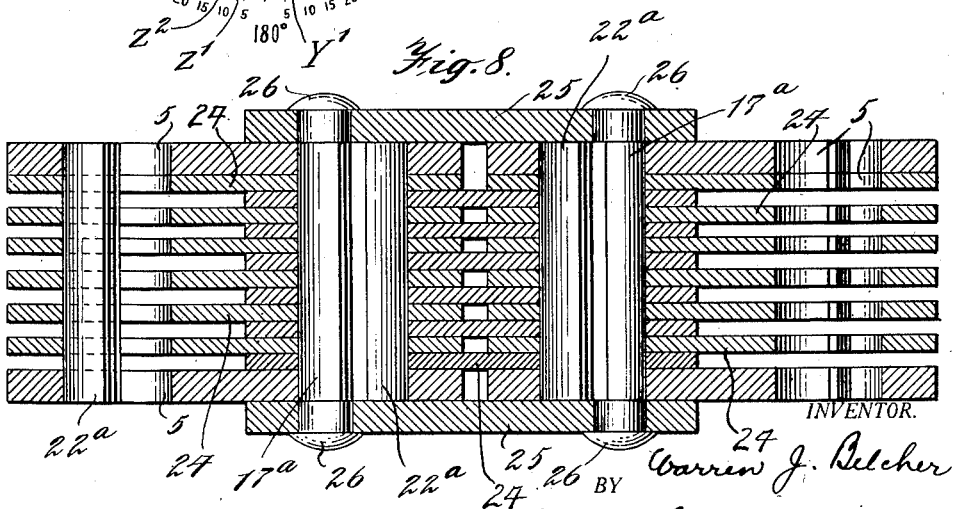
INVENTOR.
Warren J. Belcher
BY
Gifford Bull
his ATTORNEYS April 21, 1925.
W. J. BELCHER
POWER TRANSMISSION CHAIN
Filed Feb. 15, 1921   3 Sheets-Sheet 3
1,534,494
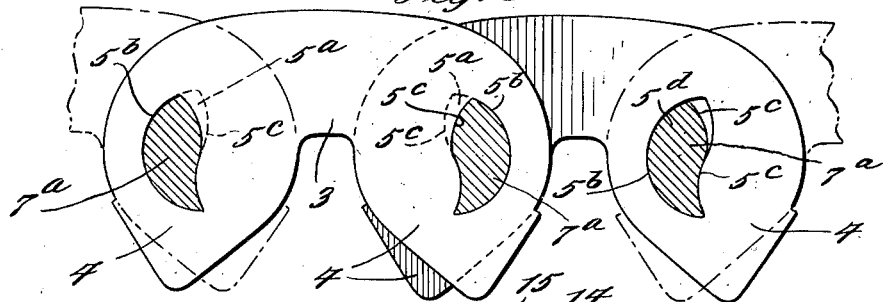
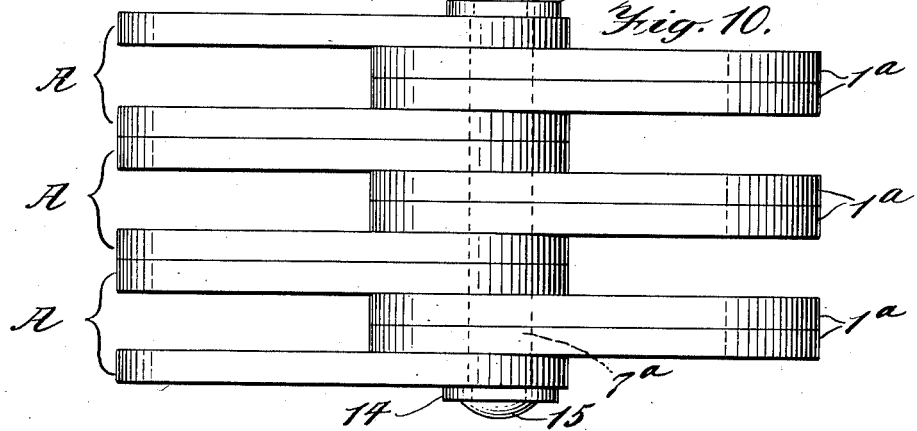
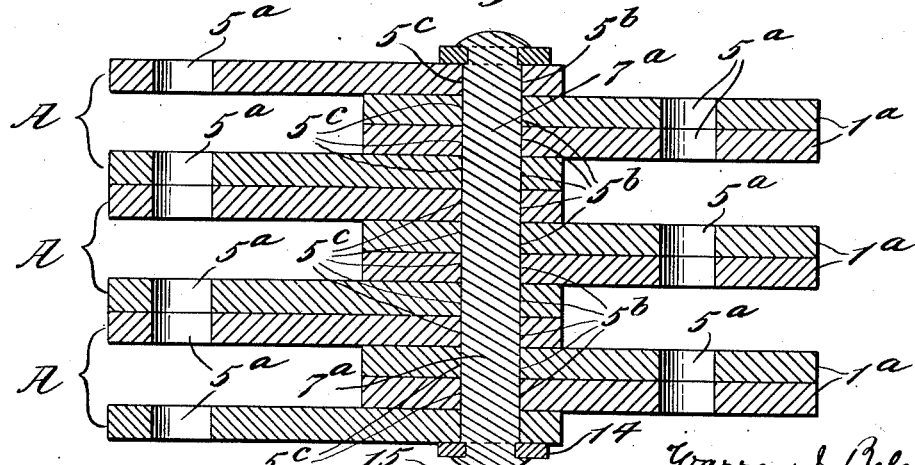
Warren J. Belcher
INVENTOR.
BY
Gifford Bull
ATTORNEYS Patented Apr. 21, 1925.

1,534,494

UNITED STATES PATENT OFFICE.

WARREN J. BELCHER, OF HARTFORD, CONNECTICUT, ASSIGNOR TO THE WHITNEY MFG. CO., OF HARTFORD, CONNECTICUT, A CORPORATION OF CONNECTICUT.

POWER-TRANSMISSION CHAIN.

Application filed February 15, 1921. Serial No. 445,057.

*To all whom it may concern:*

Be it known that I, WARREN J. BELCHER, a citizen of the United States, residing at Hartford, in the county of Hartford and State of Connecticut, have invented certain new and useful Improvements in Power-Transmission Chains, of which the following is a specification.

My invention relates broadly and generally to new and useful improvements in power transmission chains, and more particularly to that type in which the chain is composed of links consisting of toothed plates arranged with overlapping ends connected by transverse connecting means.

The object of the invention is to provide an improved chain in which the wear between the parts, and particularly that wear to which the transverse connecting means is subjected, will be reduced or prevented so as to prevent such lost motion between the parts which would result in lengthening of the chain to an objectionable degree.

The invention consists in the improvements to be more fully described hereinafter, and the novelty of which will be particularly pointed out and distinctly claimed.

I have fully and clearly illustrated my invention in the accompanying drawings to be taken as a part of this specification, and wherein—

Figure 1 is a view in side elevation of a section of chain embodying my present invention.

Fig. 2 is a top plan view of the construction shown in Fig. 1.

Fig. 3 is a section on the line 3—3 of Fig. 1.

Fig. 4 is a view in side elevation of one of the link members or plates shown in the previous figures.

Fig. 5 is a diagramamtic view showing the method of determining the form and relation of certain contacting faces on the connecting means forming part of the invention.

Fig. 6 is a section similar to that of Fig. 3, but showing another embodiment of the same invention.

Fig. 7 is a view similar to Fig. 6 of another embodiment of the same invention.

Fig. 8 is still another view similar to Figs. 3, 6 and 7 of another form of the invention, and Figs. 9, 10 and 11 are views corresponding to Figs. 1, 2 and 3, and showing another embodiment of the same invention.

Referring to the drawings by characters of reference, 1 designates a link member preferably in the form of a plate including heads or end portions 2, 2 connected by an intermediate or arch portion 3, said heads having sprocket-engaging portions or members, preferably in the form of teeth 4, 4, having inclined side faces $4^a$ adapted to engage with the teeth of a driving or driven gear or sprocket (not shown). The chain is made up of a plurality of said plates or links arranged side by side in parallel planes, with the ends or heads 2, 2 thereof in overlapping relation, the ends being connected by transverse connecting means, to be described later, by which the chain links are pivotally connected and the chain completed. The chain may be made up of a plurality of chain units A (see Figs. 2 and 3), each of which consists of said outer link plates 1, and inner or intermediate plates $1^a$, all of which may be of the same construction as shown, for example, three of such units may be used as shown in Figs. 2 and 3, and four as shown in Figs. 6 and 7.

The overlapping heads 2, 2 of the links in each unit are each provided with alining apertures 5, preferably circular in form, as shown in Figs. 1 and 4, which apertures receive transverse connecting means connecting the link plates and permitting relative movement between the same. According to one embodiment of my invention, the connecting means comprises transverse connecting pins 6, 7, extending through said alining apertures, said pins being held in the apertures in said inner and outer plates, respectively, and having contacting faces in rolling contact. The pins 6, 7 are counterparts, the pins 6 having circular rear faces 8 fitting the circular wall of the openings in the outer link plates and held fixed therein by inwardly directed stop lugs 9, 10 integral with the body of the plate, and projecting inwardly from the upper and lower sides of the link apertures 5, said lugs having oppositely inclined faces $9^a$, $9^b$, $10^a$, $10^b$. The upper lugs are each located preferably toward the end of the link to one side of a line extending at right angles to the length of the chain, while the lower lugs are located preferably at the center of the lower edge of said apertures, that is, on a line at right angles to the length of the chain. By this arrangement the circumferential distance between the faces 9ª, 10ª of the lugs is greater than the circumferential distance between the faces 9ᵇ, 10ᵇ of the lugs, so that while one of the cross-connecting pins will be held immovable between the faces 9ᵇ, 10ᵇ, a similar pin projected into the aperture between the faces 9ª, 10ª will have circumferential movement in the aperture between such faces 9ª, 10ª, under conditions to be presently described. The arrangement of the apertures and lugs in the intermediate link plates is the same as in the outer link plates, so that when the said plates are overlapped the apertures in the overlapped plates will be concentric, but the greater space 9ª, 10ª in the outer links will come opposite the lesser space 9ᵇ, 10ᵇ in the intermediate link or links, and the lesser space 9ᵇ, 10ᵇ of the outer links opposite the greater space 9ª, 10ª in the intermediate links, so that the pin 6, held in the outer links while being held fixedly, that is, against rotation in the outer links, will project into and through the space 9ª, 10ª in the intermediate links and turn in said space between said faces when the chain is flexed, the rear curved face of the said pin contacting and slidably engaging the curved face of the aperture 5 between said faces 9ª, 10ª. The pins 7 are each provided with circular rear faces 8, and said pins are tightly fitted in the space 9ᵇ, 10ᵇ in the intermediate links, said pins projecting through the link apertures and into the space 9ª, 10ª in the outer links, so that the pins 7, held by the intermediate links, have movement in the space 9ª, 10ª between the lugs in the apertures of the outer plates. It will be seen that the pins 6 are held by one link, and turn in the aperture of the other link, while the pins 7 are held by said other link and turn in the aperture of the first-named link.

The pins 6, 7 are arranged in movable contact with each other at their adjacent faces at a point approximating the center of the link apertures, that is, at the center of turning movement between the links, said faces being formed on curves providing for relative contact between the parts and reducing wear to a minimum, so that the diameters of the pins are not reduced so as to result in lost motion between the bearing faces of the pins and consequent lengthening of the chain in use.

I have discovered that a most efficient construction for providing a substantial non-wearing contact between the pins is afforded by forming said faces, respectively, on ogee curves, so arranged as to provide proper extent of surface contact when the chain is moving in a straight line, and to permit proper relative movement between the pins to provide for the necessary pivotal or swinging movement between the links when the chain is passing about a sprocket or gear. In order to accomplish this, the contacting faces of the pins are formed on ogee curves passing through the center of the link aperture, the curves on adjacent faces of the respective pins or members above the center being designed so as to permit the curves on the adjacent faces of the respective pins below the center to engage substantially throughout the length of the latter faces below the center when the chain is pulling straight, and also to provide a space between the adjacent faces above the center for relative movement of the pins when the chain is curved, as when passing about a sprocket or gear. The necessary amount of space between the upper adjacent curves depends upon the number of teeth in the sprockets over which the chain is designed to travel, that is, the space may be narrower relatively when the chain is to travel over large or many toothed sprocket wheels, but must be wider when used on sprocket wheels having less teeth or of a smaller diameter, for example, twelve teeth.

When the space is made wide enough to adapt the links to have the proper relative movement of the links upon the smallest sprocket wheel upon which the chain is adapted to be used, said space will obviously be correct for sprocket wheels of larger sizes upon which the same chain might be used. For example, if the space were made wide enough to permit proper relative movement in passing over a 12-toothed sprocket, this space would be wide enough to provide the proper relative movement to permit the chain to flex properly when passing over larger sprockets, as the necessary extent of movement for the larger sprockets would fall within the limits of the space necessary to permit the chain to pass over a 12-toothed sprocket. In designing the curved faces on the pins between which the relative movement takes place, it is desirable to avoid as much as possible the formation of an abrupt or sharp contact or projection at the center of the chain. It is apparent that when the chain is used upon a 12-toothed sprocket, in which the teeth are spaced 30° apart, that such space must be provided for relative movement between the pins as will permit the pins to swing about their center a distance of 30°. It is also desirable to so design these curves that this space will be afforded, but, as stated, abrupt contact points will be avoided. A preferred form of the curved faces may be determined in the following manner, reference being particularly made to Fig. 5 of the drawings, in which the outer circle C corresponds to the circumference of one of the bores or openings through the ends of the links, and also to the outer circumferential faces of the pins, said circle, for purposes of explanation, being divided into spaces of 2½° and 5°, in order to make clear the manner of designing the faces of the pins. The vertical diameter of the circle is shown by a line passing from zero to 180°, on the scale, this line or diameter corresponding to a line drawn through the centers of the link apertures 5 at right angles to the length of the chain when travelling between sprockets. If the pins could be designed so as to have no line contact whatever at their centers, it would be necessary to form the engaging faces on a radius of a length equal to the radius of the circle, in which event, arcs struck through the zero point on the circumference and the center of the circle from the 60° point to the right of the zero point, and from a point 60° to the left from the lower end of the vertical diameter would be tangential to each other at the center of the circle, but it is clear that were the faces on both pins so formed, said faces would engage throughout their length, and one pin could not turn relative to the other without the link aperture 5. In order to approximate as near as possible the ideal form of contact face, just described, and at the same time provide for relative motion between the pins, I alter the relation of each member of the ogee curve on each pin, so that the proper contact will be provided when the chain is travelling between the sprockets, and the proper relative motion will be afforded when the chain is passing around a sprocket.

In order to do this, the upper convex face or curve of the ogee on the pin 7 is formed on an arc having a radius equal in length to the radius of the circle forming the external surface of said pins or the circumference of the opening 5, and with this radius I strike an arc from a point on the circumference of the circle 67½° to the right from the upper end of the vertical diameter, which arc will extend through the center of the circle and a point 7½° from the vertical, as indicated by the line X—Y, Fig. 5. In a similar manner I take a radius equal to the radius of the circle and strike an arc from a point on the circumference 52½° to the right from the upper end of the vertical diameter, and strike an arc which will pass through the center of the circle and through the circumference of the latter at a point 7½° to the left of the zero point or the upper end of the vertical diameter, as shown by the line X—Z, Fig. 5, whereby the curve of the concave face on the upper portion of the pin 6 is determined. The convex face on the pin 6 is determined by taking a center 67½° to the left of the vertical diameter at the bottom of the circle and scribing an arc passing through the center of the circle and a point on the circumference of the latter 7½° to the left of the lower end of the vertical diameter, as shown by the line X—Z'. The concave face on the pin 7 is formed by taking a radius equal to the diameter of the circle, and from a point on the circle 52½° to the left from the vertical scribing an arc passing through the center of the circle and a point on the circumference of the latter 7½° to the right from the lower end of the vertical diameter of the circle, as shown by the line X—Y'. It will thus be seen that the points at which the lines X—Z and X—Y pass through the circumference of the circle are spaced 15° apart, and the same is true at the point at which the lines X—Z' and X—Y' pass through the circumference of the circle, the total circumferential distance between said points being 30°, i. e., the distance required for relative movement between the faces of the pins when the links swing relative to each other in passing around a 12-toothed gear in which the teeth are spaced 30° apart. By this arrangement it will be seen that when the pins are placed in the apertures of the links, and the two faces XZ' and XY' are brought into contact throughout their lengths, there will be a space of 30° between the faces XZ and XY. In arranging the pins in the completed chain, it is preferable to so arrange the line along which the faces of the curves XZ' and XY' meet, that when the chain is pulling straight the line along which these curves meet will be located as near as possible on a line perpendicular to the length of the chain; and for this purpose it is desirable to have the outer ends of these faces, or the line upon which these faces meet when the chain is pulling straight, terminate, for example, 10° to the left of the vertical diameter of the circle, in which event, a line forming a continuation of the outer face XZ would terminate at a point on the circumference 5° to the left from the vertical, as indicated by the line X—Z³, and the face XY, if continued, would extend through a point on the circumference 25° to the right from the vertical diameter of the circle, as indicated by line X—Y².

It is not only desirable to have the faces XZ located on a line substantially perpendicular to the length of the chain in order to get a good contact when the chain pulls straight, but also to permit proper location of the stop lug at the lower portion of the link aperture, so that a lug of proper size and strength can be employed without unnecessarily shortening the contacting surfaces YZ.

The upper stop lug 9 is located to the right or to the left, as the case may be, so as to terminate at one face at a point coincident with the upper end of the vertical diameter of the opening 5 so that the full 30° movement may take place between the two faces XZ, XY. The other face of the stop lug may be located at any point, because it has merely a fixed engagement with the pin in case a pin is used. The end portions of the contact faces of the pins or connecting members are relieved or champered, as at 11, so as to provide proper spaces between the members for location of the stop lugs 9.

In the form shown in Figs. 1, 2 and 3, wherein the chain is made up of three chain units laid side by side and parallel to each other, each unit is made up of spaced outer links 1, and pairs of inner links 1ª, the ends of the outer and inner links being overlapped and secured by cross-connecting members 6, 7, constructed as described, the members 6 being fixed in the openings in the outer links and the members 7 being fixed in the openings in the inner links. The chain units making up the chain are arranged with the members 6 in longitudinal alinement transversely of the chain, as are also the members 7, and said units are held together by means of a transverse pin 12 passing through alining longitudinal openings 13 in said members 7. The ends of the pin 12 project through openings in washers 14 located, respectively, on the outer faces of the extreme outer links, said ends being headed over, as at 15, whereby the chain units are secured together. The washers 14 are preferably of such diameter as to extend over the outer ends of the members 6 in the outermost chain units so as to act as retainers for said members.

In the form shown in Fig. 6, the chain is made up of four chain units, each of which is made up of outer and inner links connected by a member 7, but instead of having an individual member 6 for each unit, I provide a single transverse member 16 formed with a continuous face 17 similar to the ogee face on the members 6, heretofore described, said member 16 being held in the apertures 5 of the outer links and passing through the apertures 5 in the inner links of all chain units. The ends of the member 16, beyond the outer faces of the outermost links, are reduced, as at 18, and carry washers 19, the outer ends of said reduced portions being headed over, as at 20, whereby the washers are held on said member between said heads and shoulders 21 at the bases of the reduced portion 18. The washers overlap the ends of the outer members 7 so as to act as retainers therefor.

In Fig. 7 one of the connecting members is shown of the same construction as shown at 16 in Fig. 6, and instead of employing a plurality of members 7, I employ a continuous member 22, formed with a continuous contact face 23, as heretofore described, to contact the face 20ª, said member being held in the inner links and turning in the openings 5 in the outer links. The member 22 is held against longitudinal dislodgment by retaining washers 19ª, arranged and held by the member 16, in the same manner as described with reference to Fig. 6.

In the form shown in Fig. 8, the chain, instead of being built up of a plurality of chain units, as heretofore described, is made up of individual overlapped links 24, in number, transversely of the chain, sufficient to constitute a chain of the desired width. In this form, as in the others previously described, the links are provided with alining openings 5. The links are connected by transverse members 17ª and 22ª, similar to the members 17 and 22, respectively, of Fig. 6, the members 17ª being projected through openings in keeper plates 25, overlapping the meeting ends of adjacent plates, and lying over the outer ends of the members 22ª, the ends of the members 17ª being headed over, as at 26, whereby the keeper plates are held in position.

In Figs. 9, 10 and 11 is shown another embodiment of the same invention, in which the novel contacting faces at the joint instead of being made on two coacting transverse members or pins, are made, respectively, on a wall of the opening in one of the links, and a pin or transverse member carried by the end of the overlapping link. As shown in these figures, one of the links is provided with openings 5ª corresponding to the openings 5, heretofore described, and each having a circular wall 5ᵇ arranged toward the end of the link, and an inner wall 5ᶜ formed on an ogee curve, for example, like the curve X—Y² and X—Z² (Fig. 5). This link may be the pin-carrying link. The overlapping link is provided with openings 5ᵈ similar to the openings 5ª, heretofore described, but arranged reversely, that is, with the circular walls innermost, and the ogee walls toward the ends of the link, these latter walls having their curvature, for example, like the curve X—Z² and X—Z³. This may be what is known as the pivoting link. When the chain links are assembled, the opening 5ª, for example, in the rear of its link, is arranged in alinement with the opening 5ᵈ in the forward end of the overlapping link, and the rear opening in the latter will be arranged in alinement with the forward opening in the next following pin link. The links are then secured together by a transverse member or pin 7ª, such as heretofore described, with the curved rear face thereof toward the curved walls of the alining openings 5ª and 5ᵈ, and with the concave-convex face of the pin opposed to the ogee curved faces in said alining openings 5ª, 5ᵈ, after which the pin may be secured in place against endwise movement, in the same manner as shown and described with reference to Figs. 6, 7 and 8. It will be understood that in this form the fixed curved faces carried by the links, and the curved faces on the connecting member are formed in the same manner as heretofore described, particularly with reference to Fig. 5. It will also be understood that the ogee faces on the walls of said openings and said connecting member are disposed relative to the center so as to give the proper swinging movement between the links in passing about a sprocket, the curve of the pin and the curve of the opening in which it is seated conforming to the curve $XY^2$—$XZ^2$, while the curve in the opening in the link and in which the pin turns conforming to the curve $XZ^3$—$XZ^2$.

In each of the forms illustrated, it will be noted that each of the connecting pins is held fixedly in some of the members by being forced into the space provided for such member. For instance, in the form shown in Figs. 1 to 3, the member 6 is held between the faces $9^b$ and $10^b$ in the outer link 1 and the member 7 is similarly held in the intermediate links $1^a$. Consequently, the only motion between the links arises from the motion of the ogee surfaces on each other, and any possibility of motion between the connecting pins and their circumferential contacting faces with the connecting members is prevented. In other words, the only wearing surface is on the ogee contacting surfaces. This is further insured by making the faces $9^b$ and $10^b$ of the lugs 9 and 10 face toward the circular part of the opening to receive the pin 6 or 7, as the case may be. Consequently, these faces and the circumferential portion constitute a kind of partially closed opening of such a character that the pin, when forced into the opening, will be held tightly against the circumferential portion by the reaction against faces $9^b$ and $10^b$. The lugs 9 and 10 therefore do not merely prevent circumferential motion of the connecting pins, but also insure that the pin shall be held in rigid contact at all times with the circumferential portion of the opening, while at the same time, the rocking of the links on each other is carried entirely by the contact of these connecting members without the addition of other wear parts.

It will be noted that, in the illustrated forms, in which two connecting pins with contacting faces are used, the pins are of the same shape in cross section and that, similarly, all the plates may be duplicates of each other, since the openings in the several link plates constituting an overlapping portion of the chain connected by a pair of such pins, are all alike.

What I claim and desire to secure by Letters Patent of the United States is:—

1. A transmission chain comprising links consisting of overlapping toothed plates, adjacent plates having registering apertures at their overlapping ends, and connecting members extending through said apertures and held in the respective plates, said connecting members having ogee curved faces in contact with each other.

2. A transmission chain comprising links consisting of overlapping toothed plates having registering apertures at their overlapping portions, and members located in said apertures, each of which members is provided with a face formed on an ogee curve, said faces being in contact.

3. A transmission chain comprising links consisting of overlapping toothed plates having registering apertures at their overlapping portions, and members located in said apertures, each of which members is provided with a face formed on an ogee curve, said faces being in contact, and said curves being so formed as to provide rotary lost motion between said members.

4. A transmission chain comprising overlapping link members having teeth and connections between said members having cooperating ogee curved bearing faces in rocking engagement with each other.

5. A transmission chain having links composed of a plurality of plates having apertures at their ends, and two-part connecting members in said apertures and having engaging faces formed on ogee curves.

6. A transmission chain comprising link plates having overlapping ends having alining apertures, and transverse connecting members, one of which is held in the aperture of one plate and turns in the aperture of the other plate, respectively, each of said members having a contact face formed on concave and convex curves cooperating with a similar but reversely arranged face on the other member.

7. A transmission chain comprising overlapping link plates having alining apertures in their overlapped ends, connecting members extending through said apertures and held, respectively, in the aperture of one plate and turning in the aperture of the other plate, each of said members having a contact face formed on concave and convex curves cooperating with a similarly but reversely arranged face on the other member, and stop means limiting the turning movement of said members.

8. A transmission chain comprising overlapping link plates having alining apertures in their overlapped ends, connecting members extending through said apertures and held, respectively, in the aperture of one plate and turning in the aperture of the other plate, each of said members having a contact face formed on concave and convex curves cooperating with a similarly but reversely arranged face on the other member, and stop lugs integral with the link plate and projecting into said apertures.

9. A transmission chain comprising a plurality of link plates having apertures, transverse connecting members in said apertures, said members having contact faces formed on ogee curves and arranged so that the ogee curve on one member is located reversely to that on the other member.

10. A transmission chain comprising a plurality of link plates having apertures, transverse connecting members in said apertures, said members having contact faces formed on ogee curves and arranged so that the ogee curve on one member is located reversely to that on the other member, and said members being arranged in said apertures so that the reverse curves below the center are in contact when the chain is pulling straight and the reverse curves above the center are spaced to permit relative turning movement when the links pass about a toothed member.

11. A transmission chain comprising overlapping link plates having alining apertures, and a pair of transverse connecting members extending through said apertures, said connecting members having oppositely curved cooperating faces formed on ogee curves and the aperture for one of said connecting members in each plate having a circular portion and a projection at each end of said circular portion, each with a face opposite the circular portion with one of the connecting members fitting tightly in the space formed by said circular portion and said faces.

12. A transmission chain comprising overlapping link plates having alining apertures, transverse connecting members, each of which is held in the aperture of one plate and turns in the aperture of the other plate, respectively, each connecting member having a contact face formed on an ogee curve, the curve of the face of one member being reversed to that on the other member, and said members being arranged in said openings so that the curves to one side of the center of turning movement contact when the chain is pulling straight.

13. A transmission chain comprising overlapping link plates having alining apertures, transverse connecting members, each of which is held in the aperture of one plate and turns in the aperture of the other plate, respectively, each connecting member having a contact face formed on an ogee curve, the curve of the face of one member being reversed to that on the other member, said members being arranged in said openings so that the curves to one side only of the center of turning movement contact when the chain is pulling straight, and the curves to the other side of the center of turning movement are circumferentially spaced a sufficient distance to permit relative turning movement between the links when the chain passes in engagement with a rotary toothed member.

14. A transmission chain comprising links consisting of overlapping toothed plates, adjacent plates having registering openings at their overlapping ends, and connecting members extending through said openings and held in the respective plates, one of said members having an ogee curved contacting surface.

15. A transmission chain having links composed of a plurality of plates having apertures at their ends, and two-part connecting members in said apertures, one of said members having an engaging surface formed on an ogee curve.

16. In a silent type chain, the combination of a plurality of overlapping links with registering apertures, two-part pintles for the joints, said parts having cooperating convex and concave surfaces in contact throughout a substantial portion of their area below the center line of the chain when the chain is under load between sprockets.

17. In a silent type chain, the combination of a plurality of links with registering apertures, two-part pintles for the joints, said parts having cooperating convex and concave surfaces in contact throughout a substantial portion of their area below the center line of the chain when the chain is under load between sprockets, and means for holding the pintle parts in a predetermined relation to the respective links.

18. In a silent type chain, the combination of a plurality of overlapping links with registering apertures, two-part rocking pintles for the joints, said parts having cooperating convex and concave surfaces in contact throughout a substantial portion of their area below the center line of the chain when the chain is under load between sprockets, whereby the elongation of the chain due to load is retarded.

In testimony whereof I have hereunto signed my name in the presence of two subscribing witnesses.

WARREN J. BELCHER.

Witnesses:
 PARK C. BOYD,
 RAYMOND W. RANDALL.